US005605513A

United States Patent [19]

Van Der Hardt Aberson

[11] Patent Number: 5,605,513

[45] Date of Patent: Feb. 25, 1997

[54] METHOD FOR LUBRICATING/COOLING TRANSMISSION IN MOTOR VEHICLE

[75] Inventor: Frederik E. C. Van Der Hardt Aberson, Hasselt., Belgium

[73] Assignee: VCST naamloze vennootschap, Belgium

[21] Appl. No.: 492,933

[22] Filed: Jun. 21, 1995

[30] Foreign Application Priority Data

Jun. 21, 1994 [BE] Belgium .............................. 09400590

[51] Int. Cl.[6] .............................. F16H 57/05

[52] U.S. Cl. .............................. 474/43; 474/91

[58] Field of Search .............................. 474/18, 28, 43–45, 474/91, 93; 475/159–161

[56] References Cited

U.S. PATENT DOCUMENTS

| | | | |
|---|---|---|---|
| 1,771,835 | 7/1930 | Bartlett . | |
| 2,288,114 | 6/1942 | Smith | 474/44 X |
| 3,052,132 | 9/1962 | Dittrich et al. | 474/18 |
| 3,280,649 | 10/1966 | Bruet | 474/45 X |
| 4,494,942 | 1/1985 | Hirano et al. | 474/28 |
| 4,850,938 | 7/1989 | Yamada | 474/28 |
| 5,033,989 | 7/1991 | Shimaguchi | 474/45 X |
| 5,273,492 | 12/1993 | Kashiwase et al. | 474/43 |

FOREIGN PATENT DOCUMENTS

| | | |
|---|---|---|
| 0321921 | 6/1989 | European Pat. Off. . |
| 0560747 | 9/1993 | European Pat. Off. . |
| 0574085 | 12/1993 | European Pat. Off. . |

*Primary Examiner*—Roger J. Schoeppel
*Attorney, Agent, or Firm*—Bacon & Thomas

[57] ABSTRACT

Method for lubricating and/or cooling a transmission unit, in particular a transmission unit of the type which makes use of a continuously variable transmission (2) with pulleys (5–6) and an endless transmission element (7) provided in between, at least one hydraulic cylinder/piston unit (13) with a pressure chamber (15) which cooperates with the continuously variable transmission (2), and a pressure compensation chamber (23) cooperating with the above-mentioned pressure chamber (15), wherein at least part of the hydraulic medium coming out of the pressure compensation chamber (23) is guided back via a number of parts of the transmission unit (1) to be lubricated and/or cooled, so as to provide for the lubrication and/or cooling of these parts.

9 Claims, 2 Drawing Sheets

1
2
II
10
11
24
23
25
13
15
4
21
22
20
20
27
A
26
F3
7
6
32
31
A
33
36
28
34
29
16
5
B
18
3
19
17
12
14
9
8
30
II 11
2

7
32
6
4
36
33
28
3
A
5
8

4
15
25
27
10
A
11
26
32
6
38
13
23
24
A
31
34
33
37
7
35
36

METHOD FOR LUBRICATING/COOLING TRANSMISSION IN MOTOR VEHICLE

BACKGROUND OF THE INVENTION

The present invention concerns a method for lubricating and/or cooling a transmission unit in motor vehicles, as well as a transmission unit applying this method.

In particular, it concerns transmission units of the type whereby the transmission ratio is regulated in a continuously variable way by means of a continuously variable transmission.

Such a continuously variable transmission includes of two pulleys in between which is provided an endless transmission element. The pulleys have conical pulley halves, of which one half can be axially moved, such that the running radiuses of the transmission element on the pulleys can be changed by moving the above-mentioned pulley halves.

The pulley halves are moved and/or pressed on by means of at least one cylinder/piston unit. In the pressure chamber of this cylinder/piston unit is provided a static pressure in order to press on and/or move the accompanying pulley half. At high rotational speeds, undesired centrifugal pressure is added on top of this static pressure.

In order to compensate for the centrifugal pressure, it is known to equip the above-mentioned transmission units with a pressure compensation chamber, which is connected to the above-mentioned pressure chamber via a passage, such that on either side of the piston of the cylinder/piston unit is built up a pressure.

The pressure compensation chamber connects with the environment via an opening, such that the superfluous hydraulic medium, usually oil, can flow away via this opening, which is then collected in the oil sump of the transmission unit.

It is also known to lubricate and/or cool the transmission element by spraying hydraulic medium on the endless transmission element.

Further, it is also known that the transmission ratio of the transmission unit is controlled as a function of a large number of factors, whereby a large number of controls are carried out by means of hydraulic valves. Both the cylinder/piston units and the hydraulic valves require a large liquid flow in a number of situations, such as in the case of creep, road-load change up and hard braking.

In order to guarantee the flow rate in such situations, a relatively large pump must be provided for the supply of the medium, as a result of which the efficiency of the transmission unit declines.

According to another possibility, a pump is used which is sufficiently large to guarantee the supply of hydraulic medium in any normal situation, and the least important consumers of the liquid supply are cut off in critical situations. Usually, these are the consumers which have a mere lubrication and/or cooling function.

On the one hand is obtained in this way that the transmission characteristics which are observed by the driver are not influenced in any way, but on the other hand there is a disadvantage in that a number of parts are loaded more heavily as they are cooled and/or lubricated less than normally.

SUMMARY OF THE INVENTION

The invention aims in general to improve the lubrication of continuously variable transmissions and according to a preferred embodiment aims to provide a solution to the disadvantage mentioned in the preceding paragraph or at least restrict it, however without the pump needing to be reinforced to this end.

To this end, the invention concerns a method for lubricating and/or cooling a transmission unit, in particular a transmission unit of the type which makes use of a continuously variable transmission with pulleys and an endless transmission element provided in between, at least one hydraulic cylinder/piston unit with a pressure chamber which cooperates with the continuously variable transmission, and a pressure compensation chamber cooperating with the above-mentioned pressure chamber, such that at least part of the hydraulic medium coming out of the pressure compensation chamber is guided back via a number of parts of the transmission unit, either on or several, to be lubricated and/or cooled, so as to provide for the lubrication and/or cooling of these parts.

It is clear that preferably all the medium coming out of the pressure compensation chamber is used to this end.

Preferably, the hydraulic medium which leaves the pressure compensation chamber, is at least used to lubricate and/or cool the endless transmission element.

The invention is particularly useful as a supplementary lubrication and cooling in transmission units, whereby the forced supply of lubricating and/or cooling liquid to a number of parts to be lubricated and/or cooled is reduced or cut off under certain circumstances, whereby the medium coming out of the pressure compensation chamber nevertheless continues to guarantee a minimal lubrication and/or cooling.

The invention also concerns a transmission unit which applies the above-mentioned method. This transmission unit is provided to this end with a guide channel which makes sure that at least part of the hydraulic medium coming out of the pressure compensation chamber is carried over a number of parts to be lubricated and/or cooled while it flows back.

BRIEF DESCRIPTION OF THE DRAWINGS

In order to better explain the characteristics of the invention, the following preferred embodiments are described as an example only without being limitative in any way, with reference to the accompanying drawings, in which.

DETAILED DESCRIPTION OF A PREFERRED EMBODIMENT

Figure 1:
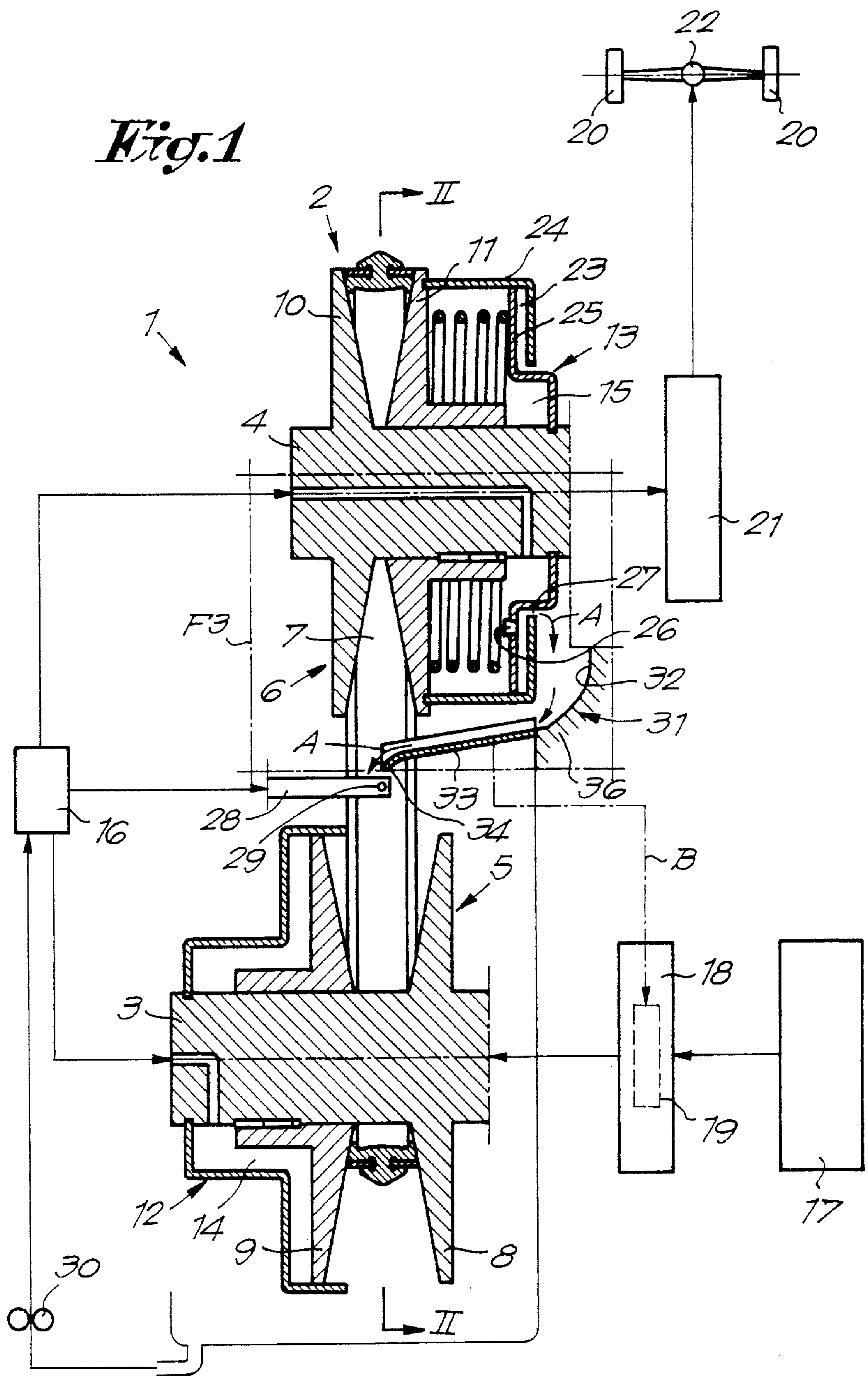
FIG. 1 schematically represents a transmission unit according to the invention.
Figure 2:
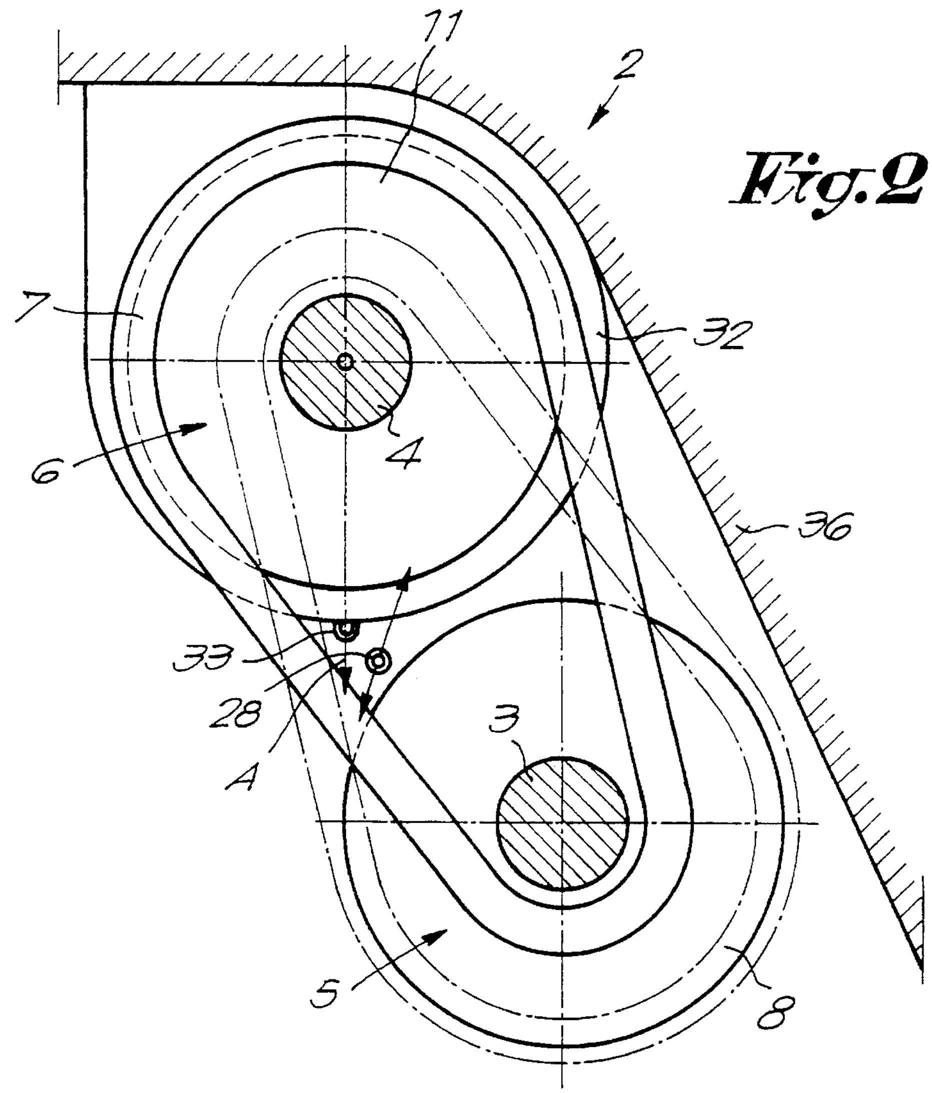
FIG. 2 shows a schematic section according to line II—II in FIG. 1.

FIGS. 1 and 2 show a transmission unit 1 for motor vehicles, which comprises a continuously variable transmission 2 and means to change the transmission ratio thereof.

The continuously variable transmission 2 mainly consists of an ingoing shaft 3, an outgoing shaft 4, two pulleys 5 and 6 which are mounted on the shafts 3 and 4 respectively, and an endless transmission element 7. The pulleys 5 and 6 include of conical pulley halves 8–9 and 10–11 which can be axially moved in relation to one another. In the example shown, the pulley halves 9 and 10 can be axially moved to this end, whereas the pulley halves 8 and 10 are axially immobile.

The means to change the transmission ratio includes of cylinder/piston units 12 and 13, which work in conjunction with the moveable pulley halves 9 and 11 respectively. By supplying more or less hydraulic medium into the pressure chambers 14 and 15 of these cylinder/piston units 12 and 13, by means of a suitable control and regulating unit 16, the transmission ratio between the ingoing shaft 3 and the outgoing shaft 4 can be changed in the known way.

The ingoing shaft 3 is driven as is known by the motor 17 of the vehicle, via a coupling and reversing unit 18, which is usually equipped with a planetary transmission 19 for reversing the sense of rotation. The outgoing shaft 4 drives the wheels 20 via a transmission 21 and a differential 22.

As represented in FIG. 1, the transmission unit 2, and in particular the secondary pulley 6, are equipped with a pressure compensation chamber 23 to compensate for rises of pressure which occur in the pressure chamber concerned, in this case in the pressure chamber 15, due to centrifugal forces. This pressure compensation chamber 23 mainly consists of the continuation of the cylinder 24 of the cylinder/piston unit 13 and a baffle plate 25. The hydraulic medium is supplied into the pressure compensation chamber 23 by means of a passage 26. The excess medium escapes from the pressure compensation chamber 23 via a relatively wide opening 27, at the height of the baffle plate 25.

It is known that several moving parts of the transmission unit need to be lubricated and/or cooled. Also, it is customary to supply lubricating and/or cooling liquid to these parts, for which the above-mentioned hydraulic medium is normally used.

Two of these parts are the endless transmission element 7 and the planetary transmission 19.

In order to cool and/or lubricate the endless transmission element 7, hydraulic medium is sprayed on the transmission element 7 by means of a liquid supply pipe 28 which has one or several discharge openings 29.

In a similar way, hydraulic medium can be supplied to the planetary transmission 19.

It is hereby supplied under pressure, whereby said pressure is supplied by a pump 30.

In order to assure, without making use of a very large pump, that all the parts of the transmission unit which are essential for a good performance can be provided with hydraulic medium in any situation whatsoever, a number of consumers can be cut off in critical situations, such as among others the liquid supply pipe 28 and the planetary transmission 19. Cutting off is done by means of the regulating unit 16.

In order to obtain that these parts are harmed as little as possible by such situations, at least part of the medium coming out of the pressure compensation chamber, and preferably the entire amount, is led back according to the invention via a number of the above-mentioned parts of the transmission unit so as to optimally guarantee the lubrication and/or cooling of these parts.

As is represented in FIGS. 1 and 2, the hydraulic medium which leaves the pressure compensation chamber 23 is preferably used at least to provide for the lubrication and/or cooling of the endless transmission element 7, by leading this medium, as indicated with the arrows A, to the transmission element 7.

It is clear that the medium which leaves the pressure compensation chamber 23 can be used for the lubrication and/or cooling of other parts, preferably parts which are cut off from their conventional supply of lubricating and/or cooling liquid in critical situations. Thus, for example medium from the pressure compensation chamber 23 can be supplied to the planetary transmission 19, as is schematically indicated with line B in FIG. 1.

It is also clear that the hydraulic medium can be divided over several parts.

In order to realize the above-mentioned method, the transmission unit 1 is provided with one or several guide channels 31 which make sure that the medium coming out of the pressure compensation chamber 23 is carried over a number of parts to be lubricated and/or cooled while it flows back.

The guide channel 31 to supply the hydraulic medium to the endless element 7 preferably includes, as is represented in FIG. 1, a receiving wall 32 with a connecting gutter 33 or such at the bottom, whose free end, which is possibly provided with a spout 34, is situated above the endless transmission element 7, one and other such that the medium coming out over the baffle plate 25 is received and collected at the bottom of the receiving wall 32 and carried via the gutter 33 to the transmission element 7.

Figure 3:
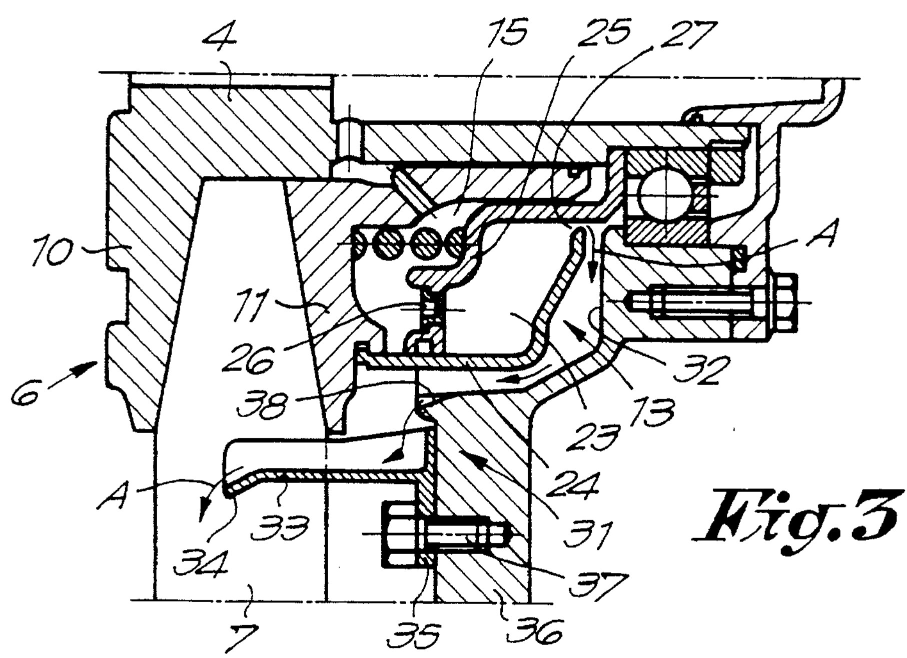
FIG. 3 shows a practical embodiment of the part which is indicated in FIG. 1 with F3.

Finally, FIG. 3 shows a practical embodiment. The gutter 32 is hereby provided with a support 35 which makes it possible to fix the transmission unit to the housing 36, for example by means of a bolt 37. The gutter 33 and the support 35 can hereby be made in one piece of synthetic material.

At the bottom in the receiving wall 32 can be formed a notch 38, for example cast, so as to obtain a better guiding of the medium.

The invention is not restricted to transmission units whereby the supply of the medium to certain parts is cut off in critical situations. It can also be used for other transmission units. Neither is it excluded to lubricate and/or cool certain parts exclusively by means of the medium coming from the pressure compensation chamber 23.

Also, it is clear that the present invention is by no means restricted to the embodiments given as an example and represented in the accompanying drawings; on the contrary, such a method for cooling and/or lubricating a transmission unit, as well as the transmission unit applying the above-mentioned method, can be made in all sorts of variants while still remaining within the scope of the invention.

I claim:

1. In a continuously variable transmission including moveable drive elements including an endless transmission element extending between at least two pulleys at least one of which includes first and second relatively movable pulley elements, at least one hydraulic actuator unit including a pressure chamber into which fluid can be supplied to vary a drive ratio of the transmission by shifting said first pulley element relative to said second pulley element and a pressure compensation chamber fluidly connected to the pressure chamber of said actuator unit, a method of lubricating and/or cooling at least one movable drive element of said transmission comprising:

providing for a flow of hydraulic medium out of said pressure compensation chamber; and guiding the hydraulic medium flowing from said pressure compensation chamber onto said endless transmission element.

2. The method according to claim 1, wherein the transmission includes a main lubricating and/or cooling medium circulated to the endless transmission element, and wherein the circulation of same can be cut off during operation of the transmission, and further comprising:

utilizing the hydraulic medium flowing from said pressure compensation chamber to supplement the main lubricating and/or cooling medium supplied to said endless transmission drive element under normal operating conditions of said transmission; and utilizing the hydraulic medium flowing from said pressure compensation chamber to provide for minimal lubricating and/or cooling of said endless transmission element when the main lubricating and/or cooling medium is cut off during operation of said transmission.

3. The method according to claim 1, wherein a movable drive element of the transmission includes a planetary transmission unit, including guiding the hydraulic medium flowing from said pressure compensation chamber onto the planetary transmission unit of said transmission.

4. A continuously variable transmission unit for a motor vehicle comprising:

a first pulley carried by an input shaft;

a second pulley carried by an output shaft;

an endless transmission element extending about said first and second pulleys;

an hydraulic cylinder/piston unit including a pressure chamber acting on one of said first and second pulleys to adjust the running ratio of the endless transmission element so as to alter a drive ratio associated with said transmission unit;

a pressure compensation chamber in fluid communication with said pressure chamber, said pressure compensation chamber including an opening remote from said pressure chamber; and a guide channel leading from said opening to said endless transmission element such that an hydraulic medium flowing through said opening is guided over the endless transmission element to lubricate and/or cool said endless transmission element.

5. The continuously variable transmission unit according to claim 4, wherein said guide channel comprises a gutter including an open portion situated above said endless transmission element.

6. The continuously variable transmission unit according to claim 5, wherein said pressure compensation chamber includes a baffle wall which defines said opening and said guide channel further comprises a receiving wall which directs the hydraulic medium flowing through said opening to said gutter.

7. The continuously variable transmission unit according claim 6, wherein a bottom portion of said receiving wall is provided with a notch to enhance guiding of the hydraulic medium.

8. The continuously variable transmission unit according to claim 4, including a planetary transmission of a reversing unit of said continuously variable transmission; and means for directing hydraulic medium flowing through said opening to said planetary transmission.

9. The continuously variable transmission unit according to claim 8, wherein said means for directing hydraulic medium to said planetary transmission comprises said guide channel, said channel further including a gutter and a guiding passage stemming from the gutter and leading to said planetary transmission.

* * * * *